(12) United States Patent
Yamauchi (10) Patent No.: US 10,015,458 B2
(45) Date of Patent: Jul. 3, 2018

(54) LIGHTING APPARATUS AND LIGHTING SYSTEM

(71) Applicant: Panasonic Intellectual Property Management Co., Ltd., Osaka (JP)

(72) Inventor: Kentaro Yamauchi, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 169 days.

(21) Appl. No.: 15/255,977

(22) Filed: Sep. 2, 2016

(65) Prior Publication Data

US 2017/0070713 A1    Mar. 9, 2017

(30) Foreign Application Priority Data

Sep. 8, 2015  (JP) ................................. 2015-176793

(51) Int. Cl.
  *G03B 21/14* (2006.01)
  *H04N 9/31* (2006.01)

(52) U.S. Cl.
  CPC ........... *H04N 9/3185* (2013.01); *G03B 21/14* (2013.01); *H04N 9/3182* (2013.01); *H04N 9/3194* (2013.01)

(58) Field of Classification Search
  CPC .. H04N 9/3185; H04N 9/3194; H04N 9/3182; G03B 21/14
  See application file for complete search history.

(56) References Cited

U.S. PATENT DOCUMENTS

| 9,268,206 | B2* | 2/2016 | Kim ..................... G03B 21/60 |
| 9,436,076 | B2* | 9/2016 | Kim ....................... E04H 3/22 |
| 2008/0284987 | A1 | 11/2008 | Yonezawa |
| 2012/0182416 | A1 | 7/2012 | Kawaguchi |
| 2013/0181901 | A1* | 7/2013 | West ....................... G09G 5/14 345/161 |
| 2015/0103257 | A1 | 4/2015 | Nakashin |

FOREIGN PATENT DOCUMENTS

| JP | 2000-241874 A | 9/2000 |
| JP | 2003-283964 A | 10/2003 |
| JP | 2006-121240 A | 5/2006 |
| JP | 2009-290354 A | 12/2009 |
| JP | 4734882 B2 | 7/2011 |
| JP | 2012-151670 A | 8/2012 |
| JP | 2013-195741 A | 9/2013 |
| JP | 2013-218019 A | 10/2013 |
| JP | 2013-250317 A | 12/2013 |

* cited by examiner

*Primary Examiner* — William C Dowling
(74) *Attorney, Agent, or Firm* — McDermott Will & Emery LLP (57) ABSTRACT

A lighting apparatus which illuminates a predetermined surface of a building structure includes: a light emitter that emits illuminating light; and a determiner that determines an illumination region in such a way that at least a portion of an edge of the illumination region, which is to be illuminated with the illuminating light emitted by the light emitter, matches a predetermined reference point on the boundary between the predetermined surface and a surface adjacent to the predetermined surface. The light emitter adjusts the illuminating light to illuminate the predetermined surface according to the illumination region determined by the determiner.

16 Claims, 7 Drawing Sheets

LIGHTING APPARATUS AND LIGHTING SYSTEM

CROSS REFERENCE TO RELATED APPLICATION

This application claims the benefit of priority of Japanese Patent Application Number 2015-176793 filed on Sep. 8, 2015, the entire content of which is hereby incorporated by reference.

BACKGROUND

1. Technical Field

The present disclosure relates to a lighting apparatus and a lighting system which illuminate a building structure.

2. Description of the Related Art

Lighting apparatuses which illuminate building structures (such as walls, ceilings, and floors) are known. For example, Japanese Unexamined Patent Application Publication No. 2009-290354 discloses a technique regarding such a lighting apparatus.

The inventor has discovered that in the case where an illumination apparatus illuminates a building structure, a user can be given a strong sense of immersion and a high realistic sensation when an edge of an illumination region of the lighting apparatus matches, for example, the boundary between a wall and each of an adjacent wall, the ceiling, and the floor (referred to also as a boundary of the building structure). For example, in the case where a wall surface is illuminated with illuminating light to display an illumination pattern and a landscape image, etc., including the shadows of trees, in such a way that the boundary between the wall and each of an adjacent wall, the ceiling, and the floor matches an edge of the illumination region, a user feels as if the landscape displayed with the illuminating light has been on the wall surface.

There are, however, cases where the illumination region of the lighting apparatus becomes misaligned due to an external force such as oscillation or an impact applied to the lighting apparatus after the installation of the lighting apparatus. In order to maintain a boundary of the building structure and an edge of the illumination region in the matched state even after the lighting apparatus is installed, it is necessary to correct misalignment between the lighting apparatus and the illumination region on a routine basis, which requires time and effort.

Thus, the present disclosure provides a lighting apparatus and a lighting system which are capable of giving a user a strong sense of immersion and a high realistic sensation without correcting misalignment of an illumination region of the lighting apparatus on a routine basis.

SUMMARY

A lighting apparatus according to an aspect of the present disclosure is a lighting apparatus which illuminates a predetermined surface of a building structure, and includes: a light emitter that emits illuminating light; and a determiner that determines an illumination region in such a way that at least a portion of an edge of the illumination region matches a predetermined reference point on a boundary between the predetermined surface and a surface adjacent to the predetermined surface, the illumination region being illuminated with the illuminating light emitted by the light emitter, wherein the light emitter adjust the illuminating light to illuminate the predetermined surface according to the illumination region determined by the determiner.

A lighting system according to an aspect of the present disclosure includes: the lighting apparatus described above; and a sensor that detects the predetermined reference point.

The lighting apparatus and the lighting system according to an aspect of the present disclosure are capable of giving a user a strong sense of immersion and a high realistic sensation without correcting misalignment of an illumination region of the lighting apparatus on a routine basis.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments are described in detail with reference to the Drawings. Note that each of the embodiments described below shows one specific preferred example. The shapes, elements, the arrangement and connection of the elements, etc., shown in the following embodiments are mere examples, and are not intended to limit the scope of the present disclosure. As such, among the elements in the following embodiments, those not recited in any one of the independent claims which indicate the broadest concepts of the present disclosure are described as arbitrary elements that are included in a more preferred embodiment. Furthermore, the respective figures are schematic illustrations and are not necessarily precise illustrations.

Embodiment 1

Hereinafter, Embodiment 1 is described with reference to FIG. 1 to FIG. 8.

Configuration of Lighting System

Figure 1:
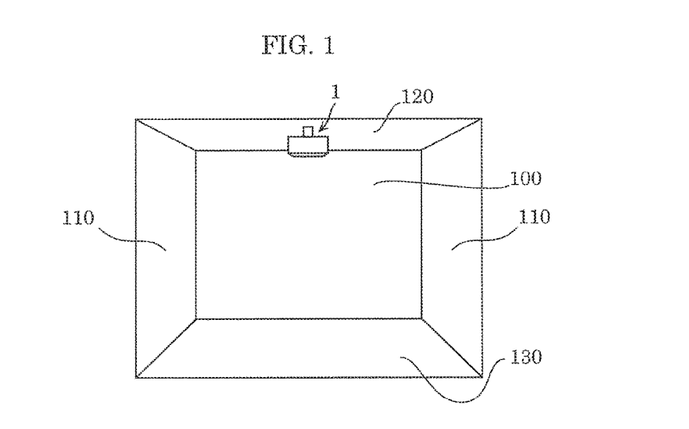
FIG. 1 illustrates an example of how a lighting system according to Embodiment 1 is installed.

FIG. 1 illustrates an example of how lighting system 1 according to Embodiment 1 is installed.

Lighting system 1 illuminates a building structure in an internal space (e.g., a room) of a building, for example. In FIG. 1, wall surfaces 100 and 110, ceiling surface 120, and floor surface 130 are illustrated as building structures.

Wall surface 100 has a substantially polygonal shape. In the present embodiment, wall surface 100 has a substantially quadrilateral shape, wall surface 110 is adjacent to the right and left of wall surface 100, and ceiling surface 120 and floor surface 130 are adjacent to the top and bottom of wall surface 100. Note that regarding the written expression "substantially XX," for example, "substantially quadrilateral" is intended to include not only perfectly quadrilateral, but also a shape that can be substantially recognized as quadrilateral.

Figure 2:
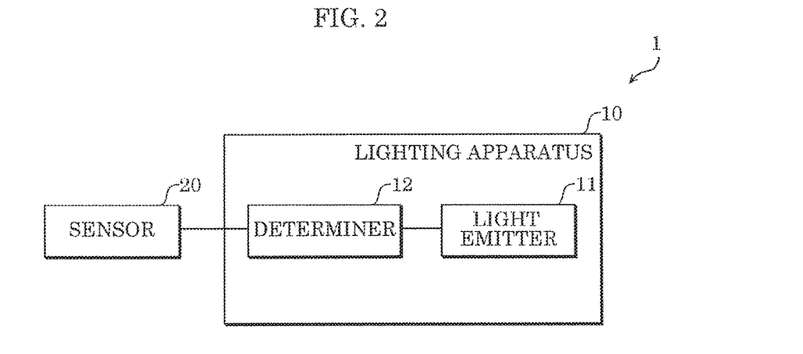
FIG. 2 is a configuration diagram of a lighting system according to Embodiment 1.

FIG. 2 is a configuration diagram of lighting system 1 according to Embodiment 1.

Lighting system 1 includes lighting apparatus 10 and sensor 20.

Lighting apparatus 10 illuminates a predetermined surface of a building structure and includes light emitter 11 and determiner 12.

Light emitter 11 emits illuminating light that produces an illuminated space. Light illuminator 11 includes, for example, a light source (not illustrated in the Drawings) and an imaging device (not illustrated in the Drawings). In light emitter 11, light emitted from the light source is transmitted by a transmissive imaging device or reflected by a reflective imaging device so that wall surface 100 is illuminated with illuminating light to display an illumination pattern, and an image, etc. As a result, for example, an illumination pattern and an image, such as a landscape image, etc., including the shadows of trees, are displayed on wall surface 100, which produce an illuminated space. Note that light emitter 11 may emit illuminating light that displays video. Furthermore, light emitter 11 may simply emit white light, colored light, or the like.

Determiner 12 determines an illumination region, which is to be illuminated with the illuminating light emitted by light emitter 11, in such a way that at least a portion of an edge of the illumination region matches a predetermined reference point on the boundary between a predetermined surface of the building structure and a surface of the building structure adjacent to the predetermined surface. Note that determiner 12 is realized as, for example, a processor executing a control program stored in storage (not illustrated in the drawings) included in lighting apparatus 10, for example, but may be realized as a microcomputer or a dedicated communication circuit, for example. Here, the edge of the illumination region refers to the boundary between the illumination region and the region outside of the illumination region. In the present embodiment, the predetermined surface of the building structure is wall surface 100, and the surface of the building structure adjacent to wall surface 100 is wall surface 110, ceiling surface 120, and floor surface 130. An operation performed by determiner 12 is described later in detail with reference to FIG. 5. The illumination region is described later in detail with reference to FIG. 4. The predetermined reference point is a point on the boundary between wall surface 100 and each of wall surface 110, ceiling surface 120, and floor surface 130 adjacent to wall surface 100 (which is referred to also as a boundary of the building structure). Here, the predetermined reference point is described with reference to FIG. 3.

Figure 3:
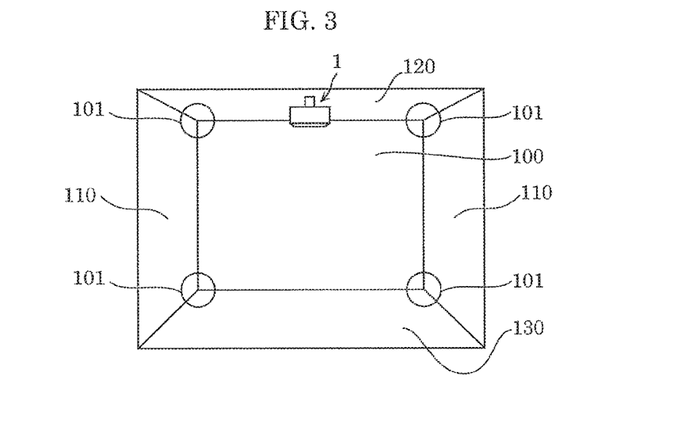
FIG. 3 illustrates reference points.

FIG. 3 illustrates reference points 101.

As illuminated in FIG. 3, reference points 101 are located at vertices of wall surface 100, for example. In other words, reference points 101 are located at the vertices in the four corners of wall surface 100 that has a substantially quadrilateral shape. Specifically, reference points 101 are the points at which wall surface 100, wall surface 110, and ceiling surface 120 are intersected and the points at which wall surface 100, wall surface 110, and floor surface 130 are intersected. Note that the positions of reference points 101 are not limited to the four corners of wall surface 100. For example, reference points 101 may be a collection (line) of points arranged on the boundary between wall surface 100 and ceiling surface 120, the boundary between wall surface 100 and wall surface 110, or the boundary between wall surface 100 and floor surface 130. This means that reference points 101 may be the boundary line between wall surface 100 and ceiling surface 120, the boundary line between wall surface 100 and wall surface 110, or the boundary line between wall surface 100 and floor surface 130.

Sensor 20 detects predetermined reference point 101 on a boundary of the building structure. Sensor 20 is, for example, a camera, and includes an imager (not illustrated in the Drawings). Sensor 20 captures images of wall surfaces 100, 110, ceiling surface 120, and floor surface 130, and detects reference points 101 in the boundaries between these surfaces. Sensor 20 detects, as reference points 101, the points at which wall surface 100, wall surface 110, and ceiling surface 120 are intersected, and the points at which wall surface 100, wall surface 110, and floor surface 130 are intersected, as described above; to put it another way, sensor 20 detects the four corners of wall surface 100 as reference points 101. Note that sensor 20 is not limited to a camera, and may be, for example, a range image sensor, or a device that detects the reference points through projection of a test pattern. Thus, sensor 20 may be any device capable of detecting a three-dimensional shape. Subsequently, sensor 20 sends information indicating detected reference points 101 to determiner 12.

Next, an illumination region, which is to be illuminated with the illuminating light emitted by light emitter 11, is described with reference to FIG. 4.

Figure 4:
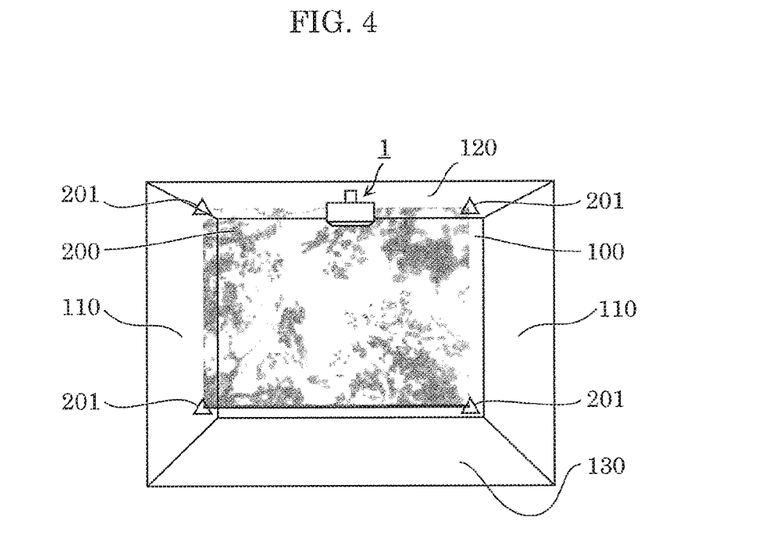
FIG. 4 illustrates an illumination region, which is to be illuminated with illuminating light emitted by a light emitter, according to Embodiment 1.

FIG. 4 illustrates illumination region 200, which is to be illuminated with illuminating light emitted by light emitter 11, according to Embodiment 1.

Illumination region 200 is a region that is illuminated with the illuminating light emitted by light emitter 11, and is, for example, a region in which an image such as that illustrated in FIG. 4 is displayed. For example, illumination region 200 is of a shape corresponding to the shape of wall surface 100. Generally, a wall often has a quadrilateral shape, and likewise, in the present embodiment, wall surface 100 has a substantially quadrilateral shape as illustrated in FIG. 4. Illumination region 200 becomes a substantially quadrilateral region corresponding to the shape of wall surface 100 as a result of the operation performed by later-described determiner 12. In FIG. 4, adjustment points 201 are further illustrated at the four corners of illumination region 200 as at least a portion of the edge (periphery) of illumination region 200.

Operation by Determiner

Next, an operation performed by determiner 12 is described with reference to FIG. 5.

Figure 5:
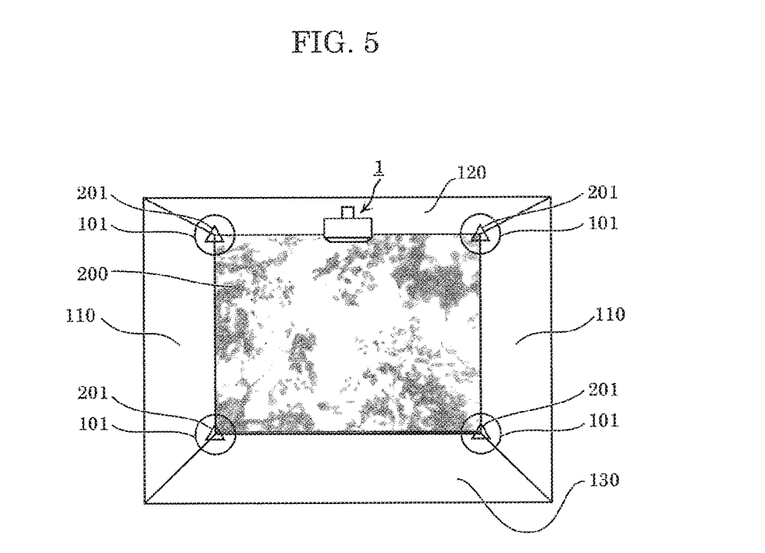
FIG. 5 illustrates an operation performed by a determiner according to Embodiment 1.

FIG. 5 illustrates an operation performed by determiner 12 according to Embodiment 1.

Determiner 12 determines illumination region 200 in such a way that at least a portion of an edge of illumination region 200 matches reference point 101 located at a vertex of wall surface 100 (the predetermined surface). In the present embodiment, determiner 12 determines illumination region 200 in such a way that adjustment point 201 matches reference point 101 as at least a portion of an edge of illumination region 200. Even in the case where illumination region 200 becomes misaligned from wall surface 100 due to an external force such as oscillation or an impact applied to lighting system 1 (lighting apparatus 10) as illustrated in FIG. 4, for example, determiner 12 determines illumination region 200 in such a way that adjustment point 201 matches reference point 101. FIG. 5 is an illustration of when determiner 12 determines illumination region 200 in such a way that an edge of illumination region 200 matches a boundary of the building structure. As described above, wall surface 100 has a substantially quadrilateral shape, and determiner 12 matches adjustment points 201 with reference points 101 that are the four corners of wall surface 100, resulting in that the shape of wall surface 100 and the shape of illumination region 200 match each other. Thus, it is possible to match an edge of illumination region 200 with the boundary between wall surface 100 and each of wall surface 110, ceiling surface 120, and floor surface 130 by matching adjustment points 201 and reference points 101 with each other. Note that although determiner 12 determines illumination region 200 in such a way that an edge of illumination region 200 matches a boundary of the building structure in FIG. 5, determiner 12 may determine illumination region 200 in such a way that at least a portion of an edge of illumination region 200 matches a boundary of the building structure. This means that determiner 12 is not required to determine illumination region 200 in such a way that the entire edge of illumination region 200 matches boundaries of the building structure.

Note that the positions of adjustment points 201 are not limited to the four corners of illumination region 200. It is sufficient that the position of adjustment point 201 is at least on a portion of an edge of illumination region 200, for example. Adjustment points 201 may be, for example, a collection (line) of points arranged on the edge of illumination region 200. In this case, determiner 12 determines illumination region 200 in such a way that the collection of adjustment points 201 arranged on an edge of illumination region 200 matches the collection of reference points 101 arranged on a boundary of the building structure. This makes it possible to match an edge of illumination region 200 with a boundary of the building structure even in the case where the predetermined surface illuminated with the illuminating light does not have a simple shape like a substantially quadrilateral shape.

Next, an operation performed by determiner 12 when it is not possible to match adjustment points 201 with reference points 101 at the four corners of wall surface 100 is described with reference to FIG. 6A to FIG. 7B.

Figure 6A:
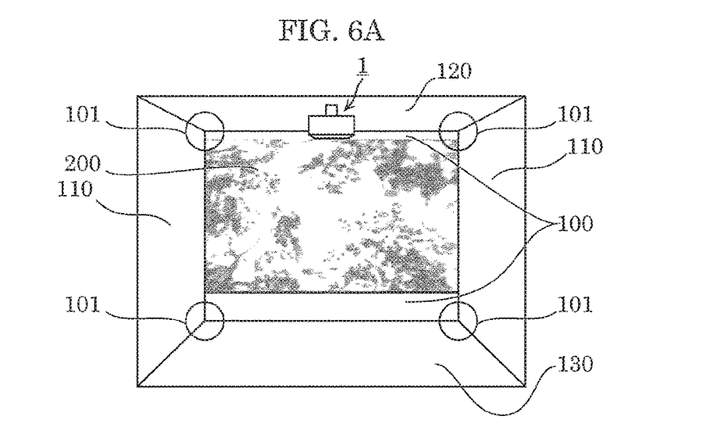
FIG. 6A is an illustration of when a wall surface is larger than an illumination region.

FIG. 6A is an illustration of when wall surface 100 is larger than illumination region 200.

Figure 6B:
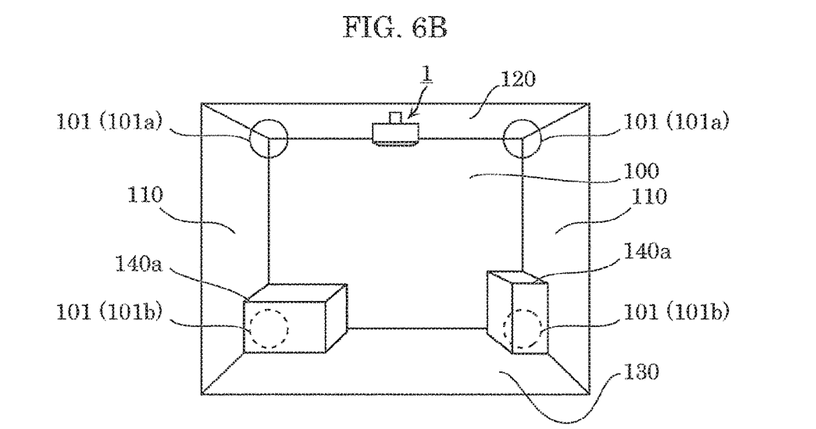
FIG. 6B is an illustration of when obstructions are located in front of reference points of a wall surface on the floor surface side.

FIG. 6B is an illustration of when obstructions 140*a* are located in front of reference points 101*b* of wall surface 100 on the floor surface 130 side.

In the case where wall surface 100 is larger than a region that can be illuminated with light from light emitter 11 as illustrated in FIG. 6A, determiner 12 cannot match adjustment points 201 with reference points 101 at the four corners of wall surface 100. Furthermore, in the case where obstructions 140*a* are placed in front of wall surface 100 on floor surface 130 in such a way that reference points 101*b* on the floor surface 130 side are hidden as illustrated in FIG. 6B, determiner 12 cannot match adjustment points 201 with reference points 101 at the four corners of wall surface 100. Therefore, determiner 12 determines illumination region 200 as illustrated in FIG. 6C.

Figure 6C:
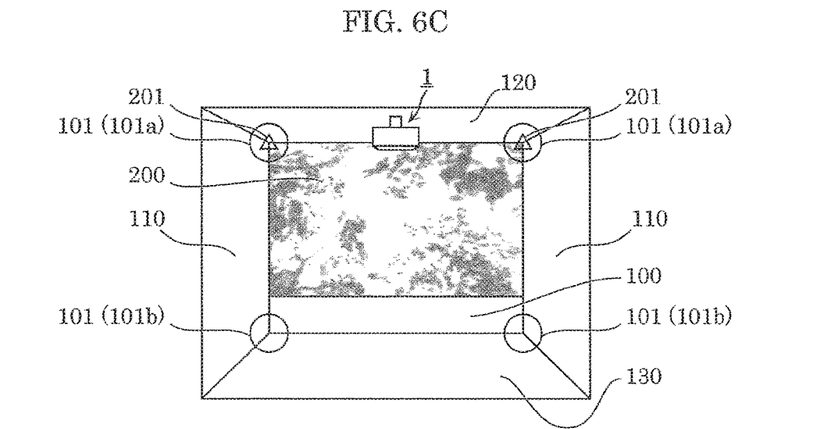
FIG. 6C illustrates an operation performed by a determiner according to Embodiment 1 to match adjustment points with reference points on the ceiling surface side.

FIG. 6C illustrates an operation performed by determiner 12 according to Embodiment 1 to match adjustment points 201 with reference points 101*a* on the ceiling surface 120 side.

Determiner 12 determines illumination region 200 in such a way that at least a portion of an edge of illumination region 200 matches reference points 101*a* of wall surface 100 on the ceiling surface 120 side as illustrated in FIG. 6C. As a result, determiner 12 cannot match adjustment points 201 with reference points 101*b* located on the floor surface 130 side among the four corners of wall surface 100, but can match adjustment points 201 with reference points 101*a* located on the ceiling surface 120 side among the four corners of wall surface 100. For example, in the case where obstructions 140*a* are placed after the installation of lighting system 11, determiner 12 determines illumination region 200 in such a way that adjustment points 201 match not reference points 101 at the four corners of wall surface 100, but reference points 101*a* of wall surface 100 on the ceiling surface 120 side.

Figure 7A:
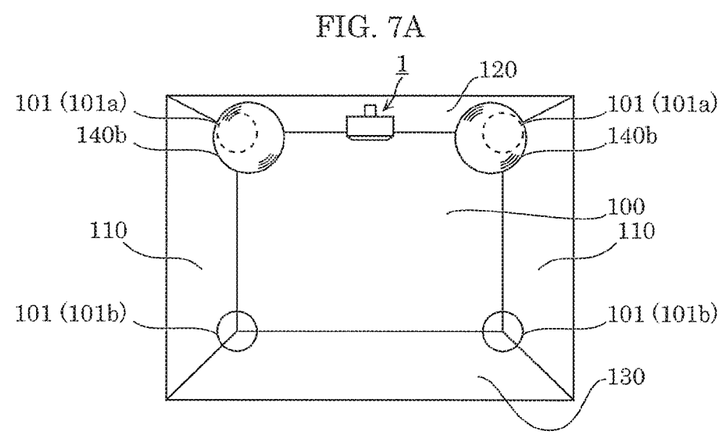
FIG. 7A is an illustration of when obstructions are located in front of reference points of a wall surface on the ceiling surface side.

Furthermore, although reference points 101 on the floor-surface-130-side are hidden by obstructions 140*a* in FIG. 6B, there are cases where reference points 101 are hidden by obstructions 140*b* as illustrated in FIG. 7A.

FIG. 7A is an illustration of when obstructions 140*a* are located in front of reference points 101*a* of wall surface 100 on the ceiling surface 120 side.

In the case where obstructions 140*b* are installed on ceiling surface 120 or hang from ceiling surface 120, in front of wall surface 100, in such a way that reference points 101*a* located on the ceiling surface 120 side are hidden as illustrated in FIG. 7A, determiner 12 cannot match adjustment points 201 with reference points 101 at the four corners of wall surface 100. Furthermore, in the case where wall surface 100 is larger than a region that can be illuminated with light from light emitter 11, for example, as in FIG. 6A, determiner 12 cannot match adjustment points 201 with reference points 101 at the four corners of wall surface 100. Therefore, determiner 12 determines illumination region 200 as illustrated in FIG. 7B.

Figure 7B:
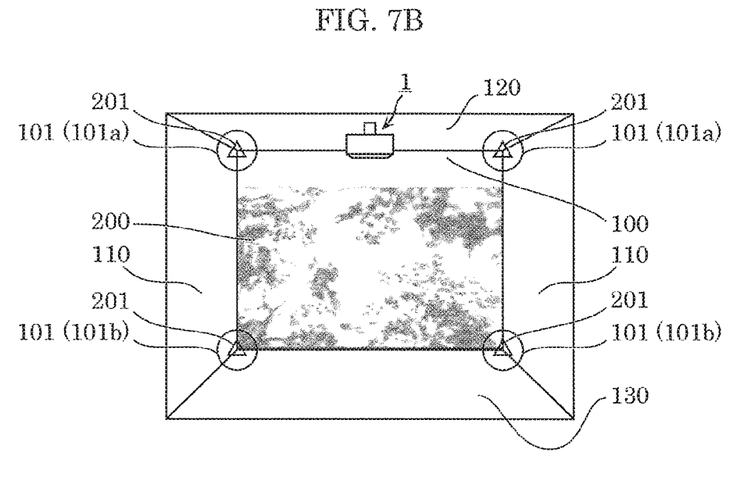
FIG. 7B illustrates an operation performed by a determiner according to Embodiment 1 to match adjustment points with reference points on the floor surface side.

FIG. 7B illustrates an operation performed by determiner 12 according to Embodiment 1 to match adjustment points 201 with reference points 101*b* located on the floor surface 130 side.

Determiner 12 determines illumination region 200 in such a way that at least a portion of an edge of illumination region 200 matches reference points 101*b* of wall surface 100 on the floor surface 130 side as illustrated in FIG. 7B. As a result, determiner 12 cannot match adjustment points 201 with reference points 101*a* located on the ceiling surface 120 side among the four corners of wall surface 100, but can match adjustment points 201 with reference points 101*b* located on the floor surface 130 side among the four corners of wall surface 100.

In this way, determiner 12 determines illumination region 200, which is to be illuminated with the illuminating light emitted by light emitter 11, in such a way that at least a portion of an edge of illumination region 200 matches predetermined reference points 101 on the boundary between the predetermined surface of the building surface and a surface of the building surface adjacent to the predetermined surface. Specifically, in the case where the predetermined surface has a substantially polygonal shape, determiner 12 determines illumination region 200 in such a way that at least a portion of an edge of illumination region 200 matches reference point 101 located at a vertex of the predetermined surface. Furthermore, in the case where the predetermined surface is wall surface 100, determiner 12 determines illumination region 200 in such a way that at least a portion of an edge of illumination region 200 matches reference points 101*a* of wall surface 100 on the ceiling surface 120 side. Alternatively, in the case where the predetermined surface is wall surface 100, determiner 12 determines illumination region 200 in such a way that at least a portion of an edge of illumination region 200 matches reference points 101*b* of wall surface 100 on the floor surface 130 side.

Operation by Light Emitter

Light emitter 11 adjusts the illuminating light to illuminate wall surface 100 (the predetermined surface) according to illumination region 200 determined by determiner 12. Note that the way that light emitter 11 illuminates wall surface 100 according to illumination region 200 is not limited to a particular way. For example, the positional relationship between a lens (not illustrated in the Drawings) and the light source may be changed by mechanical means to allow light emitter 11 to illuminate wall surface 100 according to illumination region 200. Furthermore, for example, a configuration that allows a region larger than illumination region 200 to be illuminated may be set in advance, and a region other than illumination region 200 may be shielded from light. In this case, for example, a region other than illumination region 200 may be physically masked so as not to be illuminated with light, or an imaging device corresponding to a region other than illumination region 200 may be placed in a non-luminous state.

Figure 8:
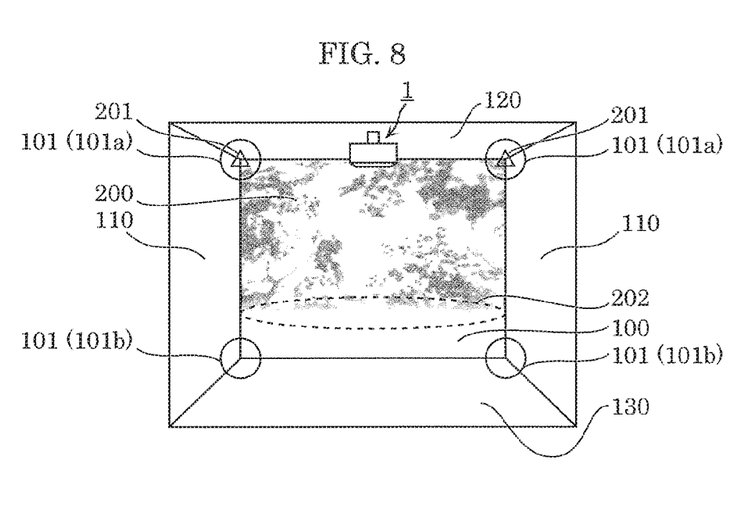
FIG. 8 illustrates an operation performed by a light emitter according to Embodiment 1 when adjustment points and reference points located in four corners of a wall surface are not matched.

The following describes, with reference to FIG. 8, an operation performed by light emitter 11 in the case where determiner 12 is unable to match adjustment points 201 with all reference points 101 located in the four corners of wall surface 100 that has, for example, a substantially quadrilateral shape as illustrated in FIG. 6C and FIG. 7B.

FIG. 8 illustrates an operation performed by light emitter 11 according to Embodiment 1 when adjustment points 201 and reference points 101 located in four corners of wall surface 100 are not matched. Illumination region 200 illustrated in FIG. 8 is of when determiner 12 has determined illumination region 200 in such a way that adjustment points 201 match reference points 101*a* of wall surface 100 on the ceiling surface 120 side as in FIG. 6C.

Light emitter 11 emits illuminating light having a gradation in illumination region 200, at an edge not matched with a boundary of the building structure. Light emitter 11 determines, for example, that the edge of illumination region 200 that connects to adjustment point 201 matching reference point 101*a* matches a boundary of the building structure. Specifically, light emitter 11 determines that the edge of illumination region 200 that is other than the edge of region 202 illustrated in FIG. 8 matches the boundary between wall surface 100 and wall surface 110 and the boundary between wall surface 100 and ceiling surface 120. In this way, light emitter 11 determines an edge of illumination region 200 that is not matched with a boundary of the building structure, and emits illuminating light having a gradation at the edge.

Light emitter 11 emits, as the illuminating light having the gradation, illuminating light having an illuminance that gradually approaches an illuminance of a region outside illumination region 200, for example. In the case where the region outside illumination region 200 has an illuminance of 100 lx, for example, light emitter 11 emits illuminating light having an illuminance that gradually approaches an illuminance of about 100 lx in region 202 from illumination region 200 toward wall surface 100 not illuminated with the illuminating light.

Light emitter 11 emits, as the illuminating light having the gradation, illuminating light having a color temperature that gradually approaches a color temperature of a region outside illumination region 200, for example. For example, in the case where the region outside illumination region 200 is illuminated with light having a warm color (approximately 3000K), for example, light emitter 11 emits illuminating light having a color temperature that gradually approaches a color temperature of about 3000 K in region 202 from illumination region 200 toward wall surface 100 not illuminated with the illuminating light.

Note that light emitter 11 may emit, as the illuminating light having the gradation, illuminating light having an illuminance and a color temperature both of which gradually approach those of a region outside illumination region 200, for example.

Advantageous Effects

The illumination region of the lighting apparatus becomes misaligned due to an external force such as oscillation or an impact applied to the lighting apparatus after the installation of the lighting apparatus. With a conventional lighting apparatus, in order to maintain a boundary of the building structure and an edge of the illumination region in the matched state even after the lighting apparatus is installed (in the state where a user can be given a strong sense of immersion and a high realistic sensation), it is necessary to correct misalignment between the lighting apparatus and the illumination region on a routine basis, which requires time and effort.

Thus, lighting apparatus 10 according to the present embodiment is lighting apparatus 10 which illuminates a predetermined surface of a building structure and includes: light emitter 11 that emits illuminating light; and determiner 12 that determines illumination region 200, which is to be illuminated with the illuminating light emitted by light emitter 11, in such a way that at least a portion of an edge of illumination region 200 matches predetermined reference point 101 on the boundary between the predetermined surface and a surface adjacent to the predetermined surface. Light emitter 11 adjusts the illuminating light to illuminate the predetermined surface according to illumination region 200 determined by determiner 12.

Furthermore, lighting system 1 according to the present embodiment includes: lighting apparatus 10 described above; and sensor 20 that detects predetermined reference point 101.

Furthermore, a lighting method according to the present embodiment is a lighting method of illuminating a predetermined surface of a building structure, and includes:

emitting illuminating light; and determining illumination region 200 in such a way that at least a portion of an edge of illumination region 200 matches predetermined reference point 101 on a boundary between the predetermined surface and a surface adjacent to the predetermined surface, illumination region 200 being illuminated with the illuminating light emitted in the emitting. In the emitting, the illuminating light is adjusted to illuminate the predetermined surface according to illumination region 200 determined in the determining.

Thus, illumination region 200 is determined in such a way that an edge of illumination region 200 matches a boundary of the building structure, and the illuminating light is emitted according to determined illumination region 200, therefore making it possible to give a user a strong sense of immersion and a high realistic sensation without correcting misalignment of illumination region 200 of lighting apparatus 10 on a routine basis.

Furthermore, the predetermined surface has a substantially polygonal shape, and determiner 12 determines illumination region 200 in such a way that at least a portion of an edge of illumination region 200 matches reference point 101 located at a vertex of the predetermined surface.

With this, in the case where the predetermined surface has a simple shape like a substantially polygonal shape, it is possible to easily match the entire edge of illumination region 200 with the entire boundaries of the building structure, only by matching at least a portion of an edge of illumination region 200 with reference point 101 located at a vertex of the predetermined surface.

Furthermore, the predetermined surface is wall surface 100, and determiner 12 determines illumination region 200 in such a way that at least a portion of an edge of illumination region 200 matches reference point 101 of wall surface 100 on the ceiling surface 120 side.

With this, even when the entire edge of illumination region 200 is not matched with the entire boundaries of wall surface 100, a user who looks at ceiling-surface-120-side area of wall surface 100 can be given a strong sense of immersion and a high realistic sensation.

Furthermore, the predetermined surface is wall surface 100, and determiner 12 determines illumination region 200 in such a way that at least a portion of an edge of illumination region 200 matches reference point 101 of wall surface 100 on the floor surface 130 side.

With this, even when the entire edge of illumination region 200 is not matched with the entire boundaries of wall surface 100, a user who looks at floor-surface-130-side area of wall surface 100 can be given a strong sense of immersion and a high realistic sensation. Note that a user's point of view is more likely to be on the ceiling surface 120 side rather than the floor surface 130 side. Therefore, it is preferable to match at least a portion of an edge of illumination region 200 with reference points 101a of wall surface 100 on the ceiling surface 120 side except in the case where obstruction 140b is present on the ceiling surface 120 side or the case where the height of ceiling surface 120 is high, for example.

Furthermore, determiner 12 determines illumination region 200 in such a way that at least a portion of an edge of illumination region 200 matches a boundary of the building structure.

With this, even in the case where the predetermined surface does not have a simple shape like a substantially polygonal shape, it is possible to match an edge of illumination region 200 with a boundary of the building structure, thus giving a user a strong sense of immersion and a high realistic sensation.

Furthermore, light emitter 11 emits illuminating light having a gradation in illumination region 200, at an edge not matched with a boundary of the building structure.

With this, the edge of illumination region 200 that is not matched with a boundary of the building structure can be made inconspicuous, and thus it is possible to give a user a strong sense of immersion and a high realistic sensation.

Furthermore, light emitter 11 emits, as the illuminating light having the gradation, illuminating light having an illuminance that gradually approaches an illuminance of a region outside illumination region 200.

With this, as a result of the illuminance of the edge of illumination region 200 that is not matched with a boundary of the building structure, gradually approaching the illuminance of a region outside illumination region 200, the edge not matched with a boundary of the building structure can be made more inconspicuous, and thus it is possible to give a user a strong sense of immersion and a high realistic sensation.

Furthermore, light emitter 11 emits, as the illuminating light having the gradation, illuminating light having a color temperature that gradually approaches a color temperature of a region outside illumination region 200.

With this, as a result of the color temperature of the edge of illumination region 200 that is not matched with a boundary of the building structure, gradually approaching the color temperature of a region outside illumination region 200, the edge not matched with a boundary of the building structure can be made more inconspicuous, and thus it is possible to give a user a strong sense of immersion and a high realistic sensation.

Embodiment 2

Hereinafter, Embodiment 2 is described with reference to FIG. 9A to FIG. 9C.

Figure 9A:
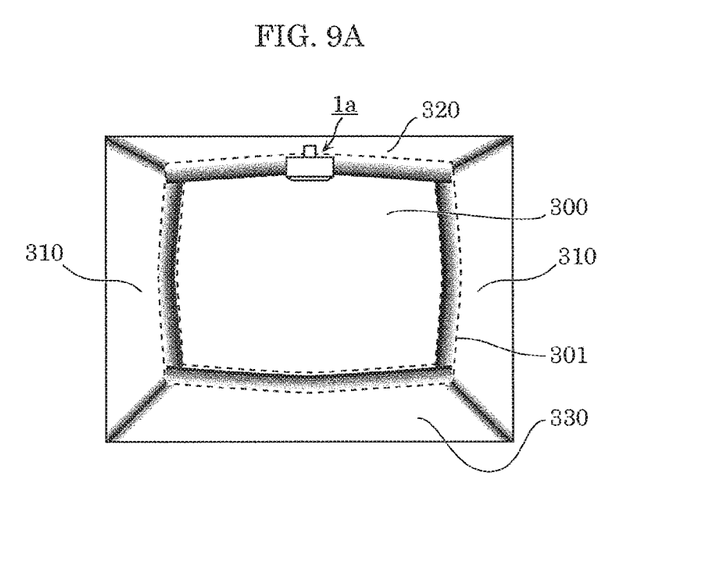
FIG. 9A illustrates an example of how a lighting system according to Embodiment 2 is installed.

FIG. 9A illustrates an example of how lighting system 1a according to Embodiment 2 is installed.

Figure 9B:
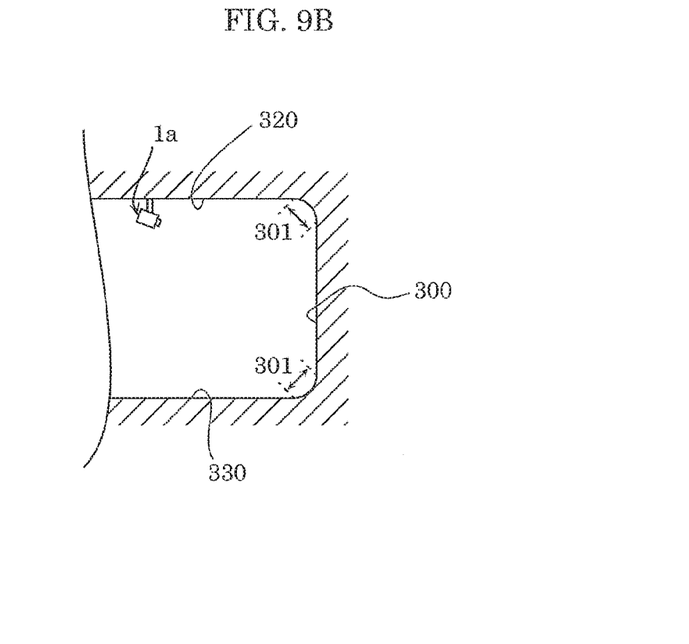
FIG. 9B illustrates a curve on a boundary of a building structure.

FIG. 9B illustrates a curve on a boundary of a building structure.

Figure 9C:
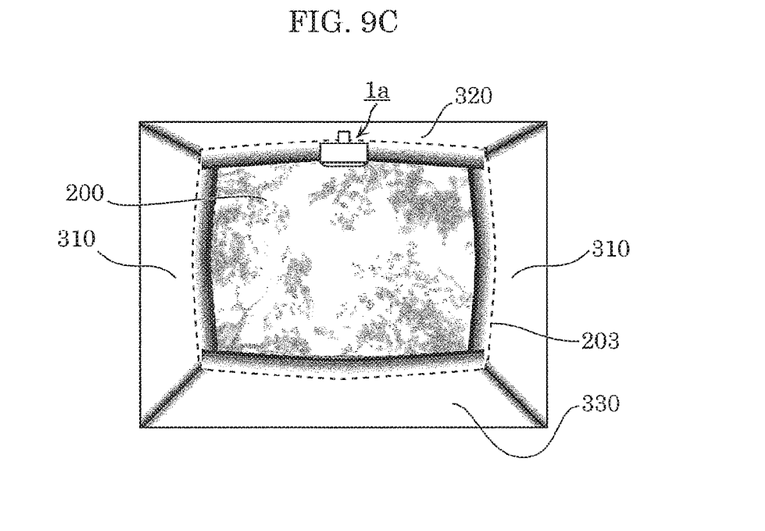
FIG. 9C illustrates operations performed by a light emitter and a determiner according to Embodiment 2.

FIG. 9C illustrates operations performed by light emitter 11 and determiner 12 according to Embodiment 2.

Lighting system 1a according to the present embodiment is applied in the case where the boundaries of the building structure are not clear. The case where the boundaries of the building structure are not clear means, for example, the case where the boundary between wall surface 300 and wall surface 310, the boundary between wall surface 300 and ceiling surface 320, and the boundary between wall surface 300 and floor surface 330 are not clear as illustrated in FIG. 9A. Specifically, in the case where these boundaries are curved, for example, the boundaries of the building structure can be said to be not clear. In FIG. 9B, the boundary between wall surface 300 and ceiling surface 320 and the boundary between wall surface 300 and floor surface 330 are illustrated in cross-section. FIG. 9B reveals that a boundary of the building structure is curved, that is, a boundary of the building structure is not clear.

In this case, sensor 20 cannot clearly detect reference point 101. Therefore, sensor 20 estimates that a region in which the curvature of the above-described curve is greater than or equal to a predetermined value is a region in which reference point 101 is present, for example, and detects reference region 301 as the said region. Reference region 301 is, for example, the region enclosed by the dotted line illustrated in FIG. 9A. FIG. 9B also illustrates reference region 301. As just described, sensor 20 detects reference region 301 having a predetermined range as the region in which reference point 101 is present. Subsequently, sensor 20 sends information indicating detected reference points 301 to determiner 12.

Determiner 12 determines illumination region 200 in such a way that at least a portion of an edge of illumination region 200 matches at least a portion of reference region 301. Specifically, determiner 12 determines illumination region 200 in such a way that at least a portion of an edge of illumination region 200 overlaps the inside of reference region 301. FIG. 9C illustrates illumination region 200, the edge of which matches reference region 301. Thus, determiner 12 regards illumination region 200 to have an edge at least partially matching reference point 101.

Subsequently, light emitter 11 emits illuminating light having a gradation in edge vicinity 203 of illumination region 200 determined by determiner 12. Edge vicinity 203 is, for example, the region enclosed by the dotted line illustrated in FIG. 9C.

With this, even when the boundaries of the building structure are not clear, determiner 12 matches an edge of illumination region 200 with the region estimated as the region in which reference point 101 is present (reference region 301), and light emitter 11 emits illuminating light having the gradation in edge vicinity 203 of illumination region 200. Therefore, even when the boundaries of the building structure are not clear, the edge of illumination region 200 can be made inconspicuous, and thus it is possible to give a user a strong sense of immersion and a high realistic sensation.

Embodiment 3

Hereinafter, Embodiment 3 is described with reference to FIG. 10A and FIG. 10B.

Figure 10A:
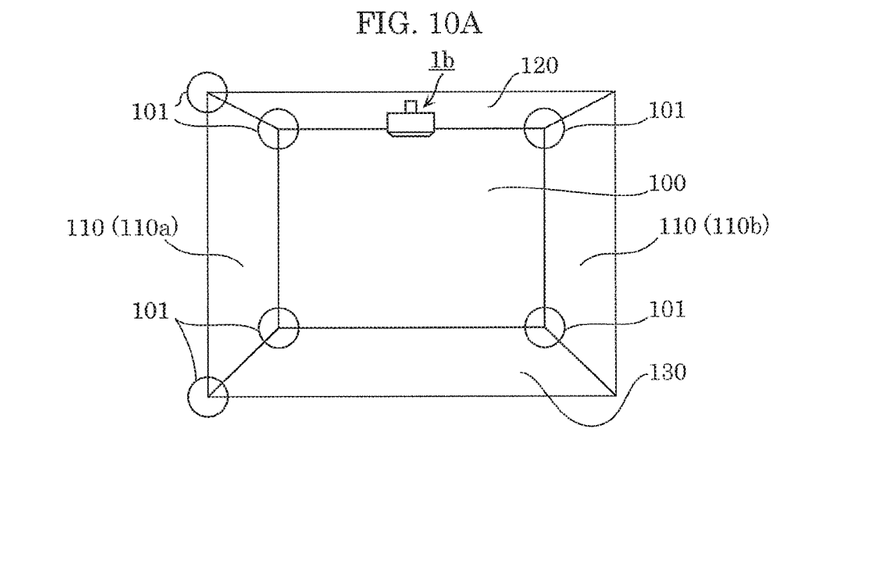
FIG. 10A illustrates an example of how a lighting system according to Embodiment 3 is installed.

FIG. 10A illustrates an example of how lighting system 1b according to Embodiment 3 is installed.

Figure 10B:
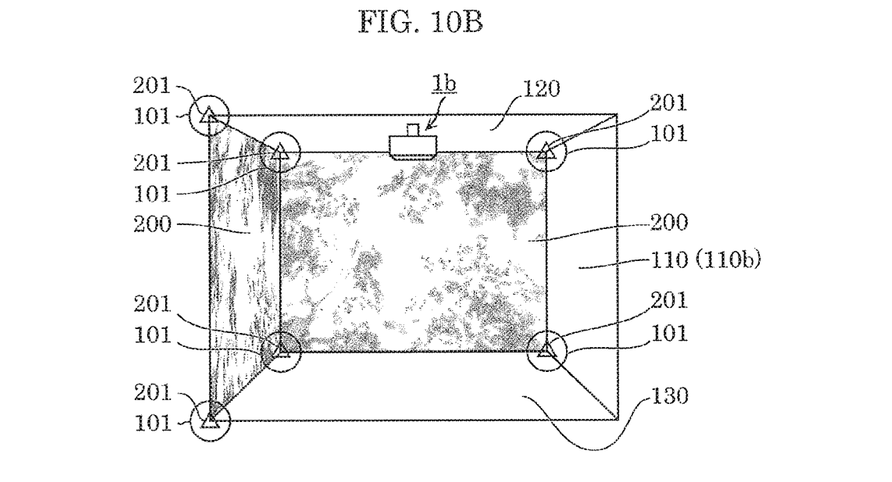
FIG. 10B illustrates operations performed by a light emitter and a determiner according to Embodiment 3.

FIG. 10B illustrates operations performed by light emitter 11 and determiner 12 according to Embodiment 3.

Lighting system 1b according to the present embodiment is applied in the case where illuminating light is emitted to a plurality of adjacent surfaces of the building structure that are not on the same plane. In the present embodiment, the plurality of adjacent surfaces of the building structure that are not on the same plane are, for example, wall surface 100 and wall surface 110a adjacent to the left of wall surface 100 in FIG. 10A. Note that the plurality of adjacent surfaces of the building structure that are not on the same plane are not limited to those stated above, and may be, for example, wall surface 100 and wall surface 110 adjacent to wall surface 100, on both sides thereof, and wall surface 100 and ceiling surface 120, and wall surface 100 and floor surface 130.

Sensor 20 detects, as reference points 101 on a boundary of the building structure, vertices of wall surface 100 and vertices of wall surface 110a as illustrated in FIG. 10A. Specifically, since two vertices of wall surface 100 on the left side thereof and two vertices of wall surface 110a on the right side thereof are common vertices of wall surface 100 and wall surface 110a, sensor detects six reference points 101. Subsequently, sensor 20 sends information indicating detected reference points 101 to determiner 12.

Determiner 12 determines illumination region 200 in such a way that at least a portion of an edge of illumination region 200 matches predetermined reference point 101 on the boundary between a plurality of adjacent surfaces and a surface adjacent to the plurality of adjacent surfaces. In this case, the plurality of adjacent surfaces are wall surface 100 and wall surface 110a, and the surface adjacent to the plurality of adjacent surfaces is wall surface 110b, coiling surface 120, floor surface 130, or a surface in front in FIG. 10A and FIG. 10B (not illustrated in the Drawings). Determiner 12 determines illumination region 200 in such a way that, as illustrated in FIG. 10B, adjustment point 201 matches reference point 101 as at least a portion of an edge of illumination region 200.

Subsequently, light emitter 11 illuminates wall surface 100 and wall surface 110a according to illumination region 200 determined by determiner 12.

Thus, the predetermined surface includes a plurality of adjacent surfaces that are not on the same plane, and determiner 12 determines illumination region 200 in such a way that at least a portion of an edge of illumination region 200 matches predetermined reference point 101 on the boundary between the plurality of adjacent surfaces and a surface adjacent to the plurality of adjacent surfaces.

With this, an edge of illumination region 200 matches a boundary of the building structure, in the boundaries between not only one surface, but also a plurality of adjacent surfaces that are not on the same plane, and another surface, and therefore it is possible to give a user a strong sense of immersion and a high realistic sensation.

Other Embodiments

Although the lighting apparatus and the lighting system according to the embodiments have been described above, the present disclosure is not limited to the above-described embodiments.

For example, although the lighting system is installed on ceiling surface 120 (320) in the above embodiments, this is not the only example. For example, the lighting system may be installed on floor surface 130 (330). Moreover, the lighting system is not required to be installed on the building structure, and may be placed, for example, on a desk etc.

Furthermore, for example, although the lighting system illuminates wall surface 100 (300) in the above embodiments, this is not the only example. For example, the lighting system may illuminate ceiling surface 120 (320) or floor surface 130 (330).

Furthermore, for example, although wall surface 100 has a substantially quadrilateral shape in the above embodiments as a substantially polygonal shape, this is not the only example. For example, wall surface 100 may have a substantially triangular shape or a substantially pentagonal shape. Moreover, wall surface 100 is not required to have a substantially polygonal shape and may have another shape such as a circle.

Furthermore, for example, although lighting apparatus 10 and sensor 20 are integrated as the lighting system in the above embodiments, lighting apparatus 10 and sensor 20 may be separate units. In this case, lighting apparatus 10 includes a communication unit (not illustrated in the Drawings), and communicates with sensor 20 via a wired or wireless connection.

Note that general or specific aspects of the present disclosure may be realized as a system, method, integrated circuit, computer program, computer-readable medium such as a CD-ROM, or any given combination thereof.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus which illuminates a predetermined surface of a building structure, the apparatus comprising:
    a light emitter that emits illuminating light; and
    a determiner that determines an illumination region in such a way that at least a portion of an edge of the illumination region matches a predetermined reference point on a boundary between the predetermined surface and a surface adjacent to the predetermined surface, the illumination region being illuminated with the illuminating light emitted by the light emitter,
    wherein the light emitter adjusts the illuminating light to illuminate the predetermined surface according to the illumination region determined by the determiner.

2. The lighting apparatus according to claim 1,
    wherein the predetermined surface has a substantially polygonal shape, and
    the determiner determines the illumination region in such a way that at least a portion of an edge of the illumination region matches a reference point located at a vertex of the predetermined surface.

3. The lighting apparatus according to claim 1,
    wherein the predetermined surface is a wall surface, and
    the determiner determines the illumination region in such a way that at least a portion of an edge of the illumination region matches a reference point of the wall surface on a ceiling surface side.

4. The lighting apparatus according to claim 1,
    wherein the predetermined surface is a wall surface, and
    the determiner determines the illumination region in such a way that at least a portion of an edge of the illumination region matches a reference point of the wall surface on a floor surface side.

5. The lighting apparatus according to claim 1,
    wherein the determiner determines the illumination region in such a way that at least a portion of an edge of the illumination region matches the boundary.

6. The lighting apparatus according to claim 1,
    wherein the light emitter emits illuminating light having a gradation in the illumination region, at an edge not matched with the boundary.

7. The lighting apparatus according to claim 6,
    wherein the light emitter emits, as the illuminating light having the gradation, light having an illuminance that gradually approaches an illuminance of a region outside the illumination region.

8. The lighting apparatus according to claim 6,
    wherein the light emitter emits, as the illuminating light having the gradation, light having a color temperature that gradually approaches a color temperature of a region outside the illumination region.

9. The lighting apparatus according to claim 7,
    wherein the light emitter emits, as the illuminating light having the gradation, light having a color temperature that gradually approaches a color temperature of a region outside the illumination region.

10. The lighting apparatus according to claim 1,
    wherein the light emitter emits illuminating light having a gradation in an edge vicinity of the illumination region.

11. The lighting apparatus according to claim 10,
    wherein the light emitter emits, as the illuminating light having the gradation, light having an illuminance that gradually approaches an illuminance of a region outside the illumination region.

12. The lighting apparatus according to claim 10,
    wherein the light emitter emits, as the illuminating light having the gradation, light having a color temperature that gradually approaches a color temperature of a region outside the illumination region.

13. The lighting apparatus according to claim 11,
    wherein the light emitter emits, as the illuminating light having the gradation, light having a color temperature that gradually approaches a color temperature of a region outside the illumination region.

14. The lighting apparatus according to claim 1,
    wherein the predetermined surface includes a plurality of adjacent surfaces that are not on a same plane, and
    the determiner determines the illumination region in such a way that at least a portion of an edge of the illumination region matches a predetermined reference point on a boundary between the plurality of adjacent surfaces and a surface adjacent to the plurality of adjacent surfaces.

15. An illumination system, comprising:
    the lighting apparatus according to claim 1; and
    a sensor that detects the predetermined reference point.

16. A lighting method of illuminating a predetermined surface of a building structure, the method comprising:
    emitting illuminating light; and
    determining an illumination region in such a way that at least a portion of an edge of the illumination region matches a predetermined reference point on a boundary between the predetermined surface and a surface adjacent to the predetermined surface, the illumination region being illuminated with the illuminating light emitted in the emitting,
    wherein in the emitting, the illuminating light is adjusted to illuminate the predetermined surface according to the illumination region determined in the determining.

* * * * *